United States Patent
Ludemann et al.

(10) Patent No.: US 6,355,405 B1
(45) Date of Patent: Mar. 12, 2002

(54) MULTI-LAYER ARTICLE WITH IMPROVED ADHESION AND METHOD OF MAKING

(75) Inventors: Thomas J. Ludemann, Maplewood; Gary E. LaBelle, Hugo; Thomas C. Geisler, Cottage Grove, all of MN (US); Jerry L. Warren; Anne E. Crump, both of Medford, OR (US); Aparna V. Bhave, Woodbury, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/510,648

(22) Filed: Feb. 23, 2000

(51) Int. Cl.[7] .................... G03C 1/835; G03C 1/89; G03C 1/93; G03C 1/498; B32B 27/06

(52) U.S. Cl. .............. 430/510; 430/517; 430/523; 430/527; 430/533; 430/534; 430/535; 430/536; 428/481; 428/483; 428/500; 428/515; 428/532

(58) Field of Search .................. 430/534, 531, 430/523, 533, 535, 536, 510, 517, 527; 428/500, 481, 483, 507, 515, 532

(56) References Cited

U.S. PATENT DOCUMENTS

| | | | | |
|---|---|---|---|---|
| 3,492,122 A | * | 1/1970 | Takenaka et al. | 430/534 |
| 4,001,024 A | | 1/1977 | Dittman et al. | 427/402 |
| 4,093,458 A | * | 6/1978 | McGrail et al. | 430/534 |
| 4,366,239 A | * | 12/1982 | Shinagawa et al. | 430/534 |
| 4,569,863 A | | 2/1986 | Koepke et al. | 427/402 |
| 4,572,849 A | | 2/1986 | Koepke et al. | 427/402 |
| 4,752,559 A | | 6/1988 | Helland et al. | 430/536 |
| 5,004,669 A | | 4/1991 | Yamada et al. | 430/531 |
| 5,244,780 A | | 9/1993 | Strobel et al. | 430/535 |
| 5,384,192 A | | 1/1995 | Long et al. | 428/336 |
| 5,466,541 A | * | 11/1995 | Havenbergh et al. | 430/534 |
| 5,525,376 A | | 6/1996 | Leonard | 427/466 |
| 5,639,589 A | | 6/1997 | Bauer et al. | 430/532 |
| 5,641,544 A | | 6/1997 | Melancon et al. | 427/331 |
| 5,733,608 A | | 3/1998 | Kessel et al. | 427/547 |
| 5,789,145 A | | 8/1998 | Glocker et al. | 430/532 |
| 5,843,530 A | | 12/1998 | Jerry et al. | 427/402 |
| 5,849,363 A | | 12/1998 | Yapel et al. | 427/420 |
| 5,861,195 A | | 1/1999 | Bhave et al. | 427/402 |
| 5,928,857 A | | 7/1999 | Geisler et al. | 430/531 |
| 6,007,874 A | | 12/1999 | Bhave et al. | 427/402 |

FOREIGN PATENT DOCUMENTS

WO          96/15478          10/1995

* cited by examiner

*Primary Examiner*—Richard L. Schilling
(74) *Attorney, Agent, or Firm*—J. Lanny Tucker

(57) ABSTRACT

Multilayer articles (including imaging elements) have improved adhesion between a polymeric support and film-forming polymer-containing layers disposed thereon. This improved adhesion is provided by including in the adhesion-promoting layer next to the support two or more polymers specific properties. At least one of the polymers adheres the layer to the support, and at least one other polymer is compatible or of the same class as the film-forming polymer in the upper layer. This adhesion-promoting layer can be provided as a very thin "carrier" layer during coating operations so that desired sensitometric effects and functional properties are obtained. Preferred imaging elements having such adhesion-promoting layers are photothermographic films.

44 Claims, No Drawings

MULTI-LAYER ARTICLE WITH IMPROVED ADHESION AND METHOD OF MAKING

FIELD OF THE INVENTION

This invention relates to multilayer articles, such as radiation-sensitive imaging articles, having two or more layers on a polymeric support. A layer next to the support has a single-phase mixture of polymers that provides multiple properties including adhesion of the layer to the polymeric support. In particular, the invention is directed to photothermographic elements. The invention also relates to a method of preparing the noted articles, including photothermographic elements.

BACKGROUND OF THE INVENTION

Silver halide-containing imaging materials are well known and methods of preparing them have been well known in the industry for decades. Photographic materials are photosensitive silver halide materials that are processed to provide a visible image using conventional liquid processing solutions.

Photothermographic imaging materials and other heat-processable materials (that is materials that are heat-developable and not wet developable) are also well known. These materials are also known in the art as "dry silver" materials and generally comprise a support having coated thereon a photosensitive emulsion comprising a photosensitive silver material, a non-photosensitive, reducible silver source, a reducing agent for silver ions, and a binder.

The photosensitive silver material is generally photographic silver halide that must be in catalytic proximity to the non-photosensitive, reducible silver source. Catalytic proximity requires an intimate physical association of these two materials so that when silver atoms are generated by irradiation or light exposure, those atoms are able to catalyze the reduction of the reducible silver source. Reducible silver sources are generally silver salts of a long chain aliphatic carboxylic acids (such as a behenic or other fatty acid salts).

In both photographic and photothermographic materials, exposure of the photographic silver halide to light produces small clusters of silver atoms that form a latent image in an imagewise fashion. Since the latent image is not visible by ordinary means, it must be further processed to produce a visible image. This is accomplished by reduction of the silver ions. In photothermographic materials, reduction is achieved using the incorporated reducing agent (that is any "developer" that can reduce silver ion to metallic silver). Reduction is then brought about at elevated developing temperatures, producing a black-and-white image of elemental silver.

Because the necessary image-forming chemistry is within the material itself, such materials have a different set of problems that must be addressed. Much effort has been expended in the industry to prepare and manufacture such materials to minimize fog formation upon coating, storage and post-processing aging. Similarly, the unexposed silver halide inherently remains after development and the material must be stabilized after development.

In addition, the binders used in photothermographic elements must be stable for thermal processing and provide both layer cohesion and interlayer adhesion. For example, all coatings usually require a specific range of adhesion with underlying coatings or supports (such as polyester substrates) to meet useful end purposes. The conventional state of the art is to treat the support surface in some manner, such as with electrical corona treatment, flame treatment and glow discharge, to increase wettability and bonding strength. While these treatments do provide increased adhesion, they also leave charge or surface irregularities on the support that result in surface irregularities when an organic solvent based coating is applied. Other disadvantages with such treatments are high inherent capital costs, maintenance and upkeep of the equipment and in some cases the need for inert gases.

Another manner for improving adhesion is to apply a primer layer on the support prior to applying other layers including photosensitive layers. Such coatings include a wide range of formulations, and are usually aqueous in nature to provide the desired adhesion to subsequent layers. These methods are generally inadequate when organic solvent-based coatings are applied to the primer layer due to poor adhesion and/or migration of the components from the primer layer into upper layers. These result in a variety of unwanted physical (for example, product discoloration, haze, static discharge, gels, and poor coating quality) or chemical (for example, dye fade and sensitometric effects) effects.

WO 96/15478 (Geisler et al) and U.S. Pat. No. 5,928,857 (Geisler et al) describe IR-sensitive photothermographic elements having improved adhesion using additional adhesive materials in the photosensitive layer. Thus, besides the usual polyvinyl butyral binder, the photosensitive layer also includes a polymeric component that is not a polyvinyl acetal. This polymeric component has a higher strength of adhesion to polyester film than a polyvinyl acetal and the improved adhesion is readily observed in high-density image areas.

Primer layers for photothermographic materials are described for example in U.S. Pat. No. 4,752,559 (Helland et al) to include a pigmented acrylic polymer binder system. This binder system is said to adhere to a photosensitive layer containing a variety of polymer binders including polyvinyl acetals. Polymeric substrates can also be coated with a polyacrylate/gelatin composition that either adheres the photosensitive layer to the substrate or includes the photosensitive materials, as described in U.S. Pat. No. 5,244,780 (Strobel et al).

Block and graft copolymers are described as adhesion promoting materials in U.S. Pat. No. 5,384,192 (Long et al) between the support and the organic polymer layer (photosensitive layer). The copolymers have a component compatible with the organic polymer layer and a poly(vinyl phenol). Other more complicated polymer subbing layer materials are described in U.S. Pat. No. 5,639,589 (Bauer et al).

The use of primer layers may be necessary in some instances, but as noted above, their use presents a number of problems. In addition, they require additional coating passes, capital investment and film waste. Curl may also result from application of the additional layer.

There are several known techniques for simultaneous coating of multiple layers. For example, U.S. Pat. No. 4,001,024 (Dittman et al) describes what is known in the industry as "slide" coating technology in which a plurality of thin layers are applied to a moving web (support) to prepare photographic elements. This technology is best used with the lowermost layer being thinner (wet thickness) than the upper layers. This thinner layer has become known as a "carrier" layer and can be chosen from a wide range of materials that are compatible with the silver/gelatin containing photosensitive layers coated on top so that interlayer mixing can occur without adverse effect.

Thin "accelerating" or carrier layers are described in U.S. Pat. No. 4,569,863 (Koepke et al) for use in what is known as "curtain" coating methods for preparing multilayer photographic elements. Still other coating techniques are described in U.S. Pat. No. 4,572,849 (Koepke et al) in which thin accelerating layers are composed of various hydrophilic coating materials. In U.S. Pat. No. 5,641,544 (Melancon et al), U.S. Pat. No. 5,733,608 (Kessel et al), U.S. Pat. No. 5,849,363 (Yapel et al) and U.S. Pat. No. 5,861,195 (Bhave et al) thin "carrier fluids" and coating fluids are described as comprising non-miscible materials. The carrier layers applied in these procedures are used for some aspect of coating quality such as streak reduction, reducing air entrapment, increased line speed and reduction in "strike through".

While WO 96/15478 and U.S. Pat. No. 5,928,857 (both noted above) describe an advance in the art to adhere photothermographic imaging layer to polyester supports, there is a desire to avoid adding additional components, particularly additional binders, to the imaging layers. Yet, polyvinyl butyral, the most common binder does not satisfactorily bind the imaging layer to the polyester support.

While some polymers effectively adhere imaging layers to a polymeric film support, it has been observed that use of some adhering polymers causes a loss in sensitometric properties (such as photographic speed) or other defects.

There remains a need then, for increased adhesion between polymeric supports and organic solvent based polymeric layers coated thereon, particularly in imaging materials such as photothermographic materials where other properties of the imaging materials are not adversely affected.

SUMMARY OF THE INVENTION

The problems noted above with known coating technologies for providing improved adhesion are solved with the present invention. In particular, this invention provides an article comprising a polymeric support and having disposed thereon:

a) a first layer comprising at least one film-forming polymer, and b) a second layer interposed between and adhering the first layer and the polymeric support and containing no silver, the second layer being coated out of a predominantly organic solvent medium, and comprising a mixture of two or more polymers that include a first polymer serving to promote adhesion of the second layer to the polymeric support, and a second polymer that is compatible with or of the same class as the film-forming polymer in the first layer.

In a preferred embodiment, this invention also provides a photothermographic element comprising a polymeric support and having a photothermographic imaging layer containing at least one film-forming polymer disposed on one side of the polymeric support, and optionally having a non-imaging layer containing at least one film-forming polymer on the opposite side of the polymeric support, and having interposed between and adhering the polymeric support and either the photothermographic imaging layer or the non-imaging layer, a non-imaging adhesion-promoting layer coated out of a predominantly organic solvent medium, the non-imaging adhesion-promoting layer comprising a mixture of two or more polymers that include a first polymer serving to promote adhesion of the non-imaging adhesion-promoting layer to the polymeric support, and a second polymer that is compatible with or of the same class as the film-forming polymer in either the photothermographic imaging layer or the non-imaging layer.

Further, a method of this invention is a method of promoting adhesion of a first layer to a polymeric support comprising:

A) forming on a polymeric support, a second layer out of a second fluid predominantly comprising a second organic solvent medium, the second layer containing no silver, and B) simultaneously or subsequently, forming a first layer containing at least one film-forming polymer out of a first fluid predominantly comprising a first organic solvent on the second layer, the second layer comprising a mixture of two or more polymers that include a first polymer serving to promote adhesion of the second layer to the polymeric support, and a second polymer that is compatible with or of the same class as the film-forming polymer in the first layer.

In addition, a method of reducing delamination in a multilayer article during slitting, cutting or chopping said multilayer article comprises:

A) applying to a polymeric support, a second layer out of a second fluid predominantly comprising a second organic solvent, the second layer containing no silver, and B) simultaneously or subsequently, applying a first layer containing at least one film-forming polymer that is coated out of a first fluid predominantly comprising a first organic solvent, the second layer comprising a mixture of two or more polymers that include a first polymer serving to promote adhesion between the polymeric support and the second layer, and a second polymer that is compatible with or of the same class as the film-forming polymer in the first layer.

Thus, the article described above can be prepared using a method comprising:

A) forming on a polymeric support, a second layer out of a second fluid predominantly comprising a second organic solvent, the second layer containing no silver, and B) forming on the second layer, a first layer containing at least one film-forming polymer out of a first fluid predominantly comprising a first organic solvent, the second layer comprising a mixture of two or more polymers that include a first polymer serving to promote adhesion between the polymeric support and the second layer, and a second polymer that is compatible with or of the same class as the film-forming polymer in the first layer.

The present invention provides advantages with the use of a thin wet "carrier" layer during the coating of imaging materials. The dried thin carrier layer (identified herein as an "adhesion-promoting layer") can provide the desired adhesion between polymeric supports, particularly polyester supports, and upper layers that are formulated and coated out of organic solvents. The use of primer layers and various adhesion-promoting treatments of the support are avoided. The adhesion-promoting layer is as thin as possible so the effects on sensitometric or functional properties are minimized. In fact, some sensitometric problems such as haze and "starry night" are minimized with the present invention.

These advantages are achieved because the adhesion-promoting layer is also coated out of an organic solvent and includes a mixture of one or more "adhesion-promoting polymers" ("first" polymer) and one or more "second" polymers that are compatible with or of the same class as the film-forming polymers in the polymer-containing (for example, imaging) layer immediately above.

While the mixture of two or more polymers can be heterogeneous (multi-phase) or homogeneous (single-phase) in nature, it is preferred that this mixture be homogeneous or single-phase in nature, both during the coating operations and upon drying as a layer in the imaging element.

By "compatible with" is meant that the "second" polymer in the adhesion-promoting layer ("second" layer) and at least one film-forming polymer in the upper layer ("first" layer) form a single phase when mixed and during the time it takes for the two layers to dry after coating. The "carrier layer" dries into a distinct layer with little intermixing with the film-forming polymer layer coated above it except at the interface.

By "of the same class" is meant that the "second" and film-forming polymers are of the same chemical or structural class.

The adhesion provided by the adhesion-promoting layer is generally greater than the tensile forces applied during any chopping or slitting of the coated article.

In addition to improved adhesion, sensitometric properties (such as photographic speed) and various physical properties of the imaging materials are not adversely affected by the use of the adhesion-promoting layer described herein, and some are improved, as noted in the Examples below.

DETAILED DESCRIPTION OF THE INVENTION

The articles provided by the present invention are not limited to imaging materials, but such materials are generally preferred. Non-imaging articles prepared by this invention can be differential release products, painted articles, data storage devices (such as a magnetic computer tape or floppy or rigid disks or diskettes), lapping film or anti-reflective film having the desired structure and function that would be readily apparent to one skilled in the art from the teaching provided herein.

The invention can be used to manufacture imaging materials including, but not limited to, photographic silver halide materials, thermographic or photothermographic elements, image-receiving elements and commercial signage films. As noted above, photographic silver halide materials are sensitive to imaging radiation but require conventional wet processing to convert the latent images to visible black-and-white or color images. Thermographic elements are materials that are imaged and developed using thermal energy. While most of the following description and examples are directed to the preferred articles, that is photothermographic elements, this application is not to be construed to be so limited in scope. It is well known in the art that photographic materials are different in construction and use than thermographic and photothermographic materials (see for example U.S. Pat. No. 5,928,857, noted above, Cols. 1–3).

The articles of this invention comprise a polymeric support that is generally a flexible film that has any desired thickness and is composed of one or more polymeric materials depending upon the use of the articles. The supports are generally transparent or at least translucent, but in some instances, opaque supports may be useful. Useful polymeric materials for making such supports include, but are not limited to, polymers (such as polyethylene terephthalate and polyethylene naphthalate), cellulose acetate and other cellulose esters, polyvinyl acetal, polyolefins (such as polyethylene and polypropylene), polycarbonate, and polystyrenes. Preferred supports are composed of polymers having good heat stability, such as polyesters and polycarbonate. Polyethylene terephthalate film is the most preferred support.

Because of the advantages of the present invention, such supports are preferably uncoated and untreated prior to coating the adhesion-promoting and other layers thereon.

The adhesion-promoting layer in the articles of this invention is coated out one or more miscible organic solvents including, but not limited to, methyl ethyl ketone (2-butanone), acetone, toluene, tetrahydrofuran, ethyl acetate, ethanol, methanol, or any mixture of any two or more of these solvents. Methyl ethyl ketone is preferred for this purpose.

This adhesion-promoting layer also includes one or more adhesion-promoting polymers that are generally soluble or dispersible in the organic solvents noted above. Representative adhesion-promoting polymers can be chosen from one or more of the following classes: polyvinyl acetals (such as polyvinyl butyral and polyvinyl formal), cellulosic polymers (such as cellulose acetate, hydroxymethyl cellulose and cellulose acetate butyrate), polyvinyl chloride, polyvinyl acetate, epoxies, polyesters, polystyrene, polyacrylonitrile, polycarbonates, methacrylate polymers, maleic anhydride ester copolymers, rosin polymers, polyketone resins, and butadiene-styrene copolymers. The polyvinyl acetals, polyester resins, cellulosic polymers and vinyl polymers such as polyvinyl acetate and polyvinyl chloride are particularly preferred, and the polyvinyl acetals, polyesters and vinyl polymers are more preferred. Polyester resins are most preferred. Thus, the adhesion-promoting polymers are generally hydrophobic in nature.

The adhesion-promoting polymers are also identified as "first" polymers in the single-phase mixture of polymers. As used herein for all polymeric materials, the term "polymer" is defined to include homopolymers, copolymers and terpolymers.

The adhesion-promoting layer also includes one or more "second" polymers that are compatible with or of the same class as at least one film-forming polymers in the "first" layer defined herein. Many of the film-forming polymers useful in the "first" layer are described below (for example, binders used in imaging layers and other layers that can be disposed above the adhesion-promoting layer). One skilled in the art would readily understand from the teaching herein which polymers are "compatible with" or "of the same class" as those film-forming polymers. Particularly useful "second" polymers include, but are not limited to, polyvinyl acetals, cellulosic polymers, vinyl polymers, methacrylate polymers and maleic anhydride-ester copolymers. The most preferred "second" polymer is poly(vinyl butyral). Of course, mixtures of these second polymers can be used in the adhesion-promoting layer. These second polymers are also soluble or dispersible in the organic solvents described above.

A preferred mixture of polymers in the adhesion-promoting layer is a single phase mixture of a polyester resin and poly(vinyl butyral).

The weight ratio of "first" polymer to "second" polymer (or weight ratio of "third" polymer to the "fourth" polymer as described below) in the adhesion-promoting layer is generally at least 2:98, and preferably at least 4:96. The upper limit of this ratio if generally 95:5 and preferably 90:10.

The adhesion-promoting layer can also include still other polymers that are not defined herein as first or second polymers. These additional polymers can be either hydrophobic or hydrophilic. Some hydrophilic polymers that may be present include, but are not limited to, proteins or polypeptides such as gelatin and gelatin derivatives, polysaccharides, gum arabic, dextrans, polyacrylamides (including polymethacrylamides), polyvinyl pyrrolidones and others that would be readily apparent to one skilled in the art.

Other components of the adhesion-promoting layer include materials that may improve coatability or adhesion, antihalation dyes, crosslinking agents (such as diisocyanates), surfactants and shelf-aging promoters.

The polymers in the adhesion-promoting layer generally comprise at least 0.1 weight % (preferably at least 0.2 weight %) of the total wet coating weight of the layer. The maximum amount of such polymers is generally 40 weight %, and preferably up to 20 weight %, based on total wet coating weight.

The adhesion-promoting layer is purposely relatively thin when dried in order to provide the desired benefits (that is, sensitometric and physical properties). Typically, its dry thickness is less than 20 $\mu$m, preferably less than 5 $\mu$m and more preferably less than 1 $\mu$m. The minimum dry thickness is generally at least 0.05 and preferably at least 0.15 $\mu$m.

The adhesion-promoting layer is used to adhere the "polymer-containing layer" to the polymeric support. This polymer-containing layer can be any functional layer such as the imaging layer, an interlayer, an antihalation layer (containing one or more antihalation dyes), an antistatic layer or a layer containing a matting agent. Alternatively, these layers can have multiple functions, such as a layer that is both an antihalation layer and contains matting agent, or a layer that is both an antistatic layer and contains matting agent, or any other combination readily apparent to one skilled in the art. Preferably, the polymer-containing layer is an imaging layer (such as a photothermographic imaging layer) or an antihalation or antistatic layer that may be either side of the support (most preferably, opposite the imaging layer). The film-forming polymers generally used in such layers are well known in the art and include such classes of polymers as cellulosic polymers, polyvinyl acetals, vinyl polymers and acrylic polymers.

The one or more film-forming polymers are generally present in the upper layers in an amount of at least 1% based on dry layer weight.

In one embodiment of this invention an article comprises a polymeric support and has disposed on one side of the polymeric support:

a) a first layer comprising at least one film-forming polymer, and b) a second layer interposed between and adhering the first layer and the polymeric support and containing no silver, the second layer being coated out of a predominantly organic solvent medium, and comprising two or more polymers that form a single phase mixture, the two or more polymers including a first polymer serving to promote adhesion of the second layer to the polymeric support, and a second polymer that is compatible with or of the same class as the film-forming polymer in the first layer, and disposed on the opposing side of the polymeric support:

a) a third layer comprising at least one film-forming polymer, and b) a fourth layer interposed between and adhering the third layer and the polymeric support and containing no silver, the fourth layer being coated out of a predominantly organic solvent medium, and comprising two or more polymers that form a single phase mixture, the two or more polymers in the fourth layer including a third polymer serving to promote adhesion of the fourth layer to the polymeric support, and a fourth polymer that is compatible with or of the same class as the film-forming polymer in the third layer.

Preferably, the first and second layers in this article comprise a polyvinyl acetal resin or a cellulosic polymer, and the third and fourth layers independently comprise a polyvinyl acetal resin or a cellulosic polymer.

In one embodiment, the first layer is a silver-containing imaging layer, such as a photothermographic imaging layer. The third layer can be an antihalation layer, an antistatic layer, or a layer containing a matting agent. The second and fourth layers are directly disposed on said polymeric support.

In a preferred embodiment of the invention, the polymer-containing layer is the photosensitive imaging layer of a photothermographic element and the film-forming polymers are typically binders in that layer. These polymers and other components of such layers are described below in more detail.

The remaining disclosure of imaging elements will be directed to the preferred photothermographic elements, but the invention is not to be construed as limited to these types of elements only.

Thus, a photothermographic element of this invention comprises a polyester film support and has on one side thereof, a photothermographic imaging layer comprising a silver salt of a fatty acid, a silver reducing agent, and at least one binder polymer that is a polyvinyl acetal, and interposed between and adhering the polyester film support to the photothermographic emulsion layer, a non-imaging adhesion-promoting layer that is coated out of a predominantly organic solvent medium, the non-imaging adhesion-promoting layer comprising a single phase mixture of a polyvinyl acetal and a polyester resin, the element further comprising on the opposite side of the polyester film support, an antistatic layer comprising an antistatic agent, a matting agent and a cellulosic polymer binder, and interposed between and adhering said polyester film support to the antistatic layer, a non-imaging antihalation dye-containing adhesion-promoting layer that is coated out of a predominantly organic solvent medium, the non-imaging antihalation dye-containing adhesion-promoting layer comprising a single phase mixture of a cellulosic polymer and a polyester resin.

The Photosensitive Silver Halide

As noted above, a photothermographic element of the present invention includes one or more photosensitive silver halides in the photothermographic imaging layer. The photosensitive silver halide can be any photosensitive silver halide, such as silver bromide, silver iodide, silver chloride, silver bromoiodide, silver chlorobromoiodide, silver chlorobromide and others readily apparent to one skilled in the art.

The silver halide may be in any form that is photosensitive including, but not limited to, cubic, octahedral, rhombic dodecahedral, orthorhombic, tetrahedral, other polyhedral, or tabular morphologies and may have epitaxial growth of crystals thereon.

The silver halide grains may have a uniform ratio of halide throughout. They may have a graded halide content, with a continuously varying ratio of, for example, silver bromide and silver iodide or they may be of the core-shell-type, having a discrete core of one halide ratio, and a discrete shell of another halide ratio. Core-shell silver halide grains useful in photothermographic elements and methods of preparing these materials are described in U.S. Pat. No. 5,382,504 (Shor et al). A core-shell silver halide grain having an iridium-doped core is particularly preferred. Iridium doped core-shell grains of this type are described in U.S. Pat. No. 5,434,043 (Zou et al).

The photosensitive silver halide can be added to the imaging layer in any fashion so long as it is placed in catalytic proximity to the light-insensitive reducible silver compound that serves as a source of reducible silver.

It is preferred that the silver halide be preformed and prepared by an ex-situ process. The silver halide grains prepared ex-situ may then be added to and physically mixed with the reducible silver source. It is more preferable to form the non-photosensitive reducible silver source in the presence of ex-situ prepared silver halide. In this process, silver soap is formed in the presence of the preformed silver halide grains. Co-precipitation of the silver halide and reducible source of silver provides a more intimate mixture of the two materials (see, for example U.S. Pat. No. 3,839,049). Materials of this type are often referred to as "preformed emulsions."

It is desirable in the practice of this invention with photothermographic elements to use pre-formed silver halide grains of less than 0.10 µm average diameter in an infrared sensitized photothermographic material. It is also preferred to use iridium doped silver halide grains and iridium doped core-shell silver halide grains as disclosed in EP-A-0 627 660 and U.S. Pat. No. 5,434,043 (noted above).

Preformed silver halide emulsions used in the material of this invention can be unwashed or washed to remove soluble salts. In the latter case, the soluble salts can be removed by chill setting and leaching or the emulsion can be coagulation washed (for example by the procedures described in U.S. Pat. Nos. 2,618,556, 2,614,928, 2,565,418, 3,241,969 and 2,489,341).

It is also effective to use an in situ process in which a halogen-containing compound is added to an organic silver salt to partially convert the silver of the organic silver salt to silver halide.

Additional methods of preparing these silver halide and organic silver salts and manners of blending them are described in Research Disclosure, June 1978, item 17029, U.S. Pat. Nos. 3,700,458 and 4,076,539, and JP Applications 13224/74, 42529/76 and 17216/75. Research Disclosure is a publication of Kenneth Mason Publications Ltd., Dudley House, 12 North Street, Emsworth, Hampshire PO10 7DQ England (also available from Emsworth Design Inc., 121 West 19th Street, New York, N.Y 10011). This reference will be referred to hereinafter as "Research Disclosure".

The light-sensitive silver halide used in the photothermographic elements of the present invention is preferably present in an amount of from about 0.005 to about 0.5 mole, more preferably from about 0.01 to about 0.15 mole per mole, and most preferably from about 0.03 to about 0.12 mole, per mole of non-photosensitive reducible silver salt.

The silver halide used in the present invention may be chemically and spectrally sensitized in a manner similar to that used to sensitize conventional wet-processed silver halide photographic materials or state-of-the-art heat-developable photothermographic elements.

For example, it may be chemically sensitized with one or more chemical sensitizing agents, such as a compound containing sulfur, selenium, or tellurium, or with a compound containing gold, platinum, palladium, ruthenium, rhodium, iridium, or combinations thereof, a reducing agent such as a tin halide or a combination of any of these. The details of these procedures are described in T. H. James, The Theory of the Photographic Process, Fourth Edition, Chapter 5, pp. 149 to 169. Suitable chemical sensitization procedures are also disclosed in U.S. Pat. Nos. 1,623,499, 2,399,083, 3,297,447 and 3,297,446. One preferred method of chemical sensitization is by oxidative decomposition of a spectral sensitizing dye in the presence of a photothermographic emulsion, as described in WO 98/45754 incorporated herein by reference.

The addition of sensitizing dyes to the photosensitive silver halides provides high sensitivity to visible and infrared light by spectral sensitization. Thus, the photosensitive silver halides may be spectrally sensitized with various known dyes that spectrally sensitize silver halide. Non-limiting examples of sensitizing dyes that can be employed include cyanine dyes, merocyanine dyes, complex cyanine dyes, complex merocyanine dyes, holopolar cyanine dyes, hemicyanine dyes, styryl dyes, and hemioxanol dyes. The cyanine dyes, merocyanine dyes and complex merocyanine dyes are particularly useful. Suitable sensitizing dyes such as those described in U.S. Pat. Nos. 3,719,495, 5,393,654, 5,441,866 and 5,541,054 (Miller et al) are particularly effective.

An appropriate amount of sensitizing dye added is generally about $10^{-10}$ to $10^{-1}$ mole, and preferably, about $10^{-8}$ to $10^{-3}$ moles per mole of silver halide.

To enhance the speed and sensitivity of the photothermographic elements, it is often desirable to use one or more supersensitizers that increase the sensitivity to light. For example, preferred infrared supersensitizers are described in EP-A-0 559 228 and include heteroaromatic mercapto compounds or heteroaromatic disulfide compounds of the formulae: Ar-S-M and Ar-S-S-Ar, wherein M represents a hydrogen atom or an alkali metal atom. Ar represents a heteroaromatic ring or fused heteroaromatic ring containing one or more of nitrogen, sulfur, oxygen, selenium, or tellurium atoms. Preferably, the heteroaromatic ring comprises benzimidazole, naphthimidazole, benzothiazole, naphthothiazole, benzoxazole, naphthoxazole, benzoselenazole, benzotellurazole, imidazole, oxazole, pyrazole, triazole, thiazole, thiadiazole, tetrazole, triazine, pyrimidine, pyridazine, pyrazine, pyridine, purine, quinoline, or quinazolinone. However, compounds having other heteroaromatic rings are envisioned to be suitable supersensitizers.

The heteroaromatic ring may also carry substituents. Examples of preferred substituents are halogens (such as bromine and chlorine), hydroxy, amino, carboxy, alkyl groups (for example of 1 or more carbon atoms and preferably 1 to 4 carbon atoms) and alkoxy groups (for example of 1 or more carbon atoms and preferably of 1 to 4 carbon atoms).

Most preferred supersensitizers are 2-mercaptobenzimidazole, 2-mercapto-5-methylbenzimidazole (MMBI), 2-mercaptobenzothiazole and 2-mercaptobenzoxazole (MBO).

If used, a supersensitizer is generally present in an emulsion layer in an amount of at least about 0.001 mole per mole of silver in the emulsion layer. More preferably, a supersensitizer is present within a range of about 0.001 mole to about 1.0 mole, and most preferably, about 0.01 mole to about 0.3 mole, per mole of silver halide.

Non-Photosensitive Reducible Silver Source Material

The non-photosensitive reducible silver source used in photothermographic elements can be any material that contains a source of reducible silver ions. Preferably, it is a silver salt that is comparatively stable to light and forms a silver image when heated to 80° C. or higher in the presence of an exposed photo-catalyst (such as silver halide) and a reducing agent.

Silver salts of organic acids, particularly silver salts of long-chain fatty carboxylic acids are preferred. The chains typically contain 10 to 30, and preferably 15 to 28, carbon atoms. Suitable organic silver salts include silver salts of organic compounds having a carboxyl group. Examples thereof include a silver salt of an aliphatic carboxylic acid and a silver salt of an aromatic carboxylic acid. Preferred examples of the silver salts of aliphatic carboxylic acids include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof. Silver salts that can be substituted with a halogen atom or a hydroxyl group also can be effectively used. Preferred examples of the silver salts of aromatic carboxylic acid and other carboxyl group-containing compounds include, but are not limited to, silver benzoate, a silver-substituted benzoate, such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenylbenzoate, silver gallate, silver tannate, silver phthalate, silver terephthalate, silver salicylate, silver phenylacetate, silver pyromellilate, a silver salt of 3-carboxymethyl-4-methyl-4-thiazoline-2-thione or others as described in U.S. Pat. No. 3,785,830, and silver salts of aliphatic carboxylic acids containing a thioether group as described in U.S. Pat. No. 3,330,663. Soluble silver carboxylates having increased solubility in coating solvents and affording coatings with less light scattering can also be used. Such silver carboxylates are described in U.S. Pat. No. 5,491,059. Mixtures of any of the silver salts described herein can also be used if desired.

Silver salts of compounds containing mercapto or thione groups and derivatives thereof can also be used. Preferred examples of these compounds include, but are not limited to, a silver salt of 3-mercapto-4-phenyl-1,2,4-triazole, a silver salt of 2-mercaptobenzimidazole, a silver salt of 2-mercapto-5-aminothiadiazole, a silver salt of 2-(2-ethylglycolamido)benzothiazole, silver salts of thioglycolic acids (such as a silver salt of a S-alkylthioglycolic acid, wherein the alkyl group has from 12 to 22 carbon atoms), silver salts of dithiocarboxylic acids (such as a silver salt of dithioacetic acid), a silver salt of thioamide, a silver salt of 5-carboxylic-1-methyl-2-phenyl-4-thiopyridine, a silver salt of mercaptotriazine, a silver salt of 2-mercaptobenzoxazole, silver salts as described in U.S. Pat. No. 4,123,274 (for example, a silver salt of a 1,2,4-mercaptothiazole derivative, such as a silver salt of 3-amino-5-benzylthio-1,2,4-thiazole), and a silver salt of thione compounds [such as a silver salt of 3-(2-carboxyethyl)-4-methyl-4-thiazoline-2-thione as disclosed in U.S. Pat. No. 3,201, 678].

Furthermore, a silver salt of a compound containing an imino group can be used. Preferred examples of these compounds include but are not limited to, silver salts of benzotriazole and substituted derivatives thereof (for example, silver methylbenzotriazole and silver 5-chlorobenzotriazole), silver salts of 1,2,4-triazoles or 1-H-tetrazoles as described in U.S. Pat. No. 4,220,709, and silver salts of imidazoles and imidazole derivatives. Moreover, silver salts of acetylenes can also be used, as described for example in U.S. Pat. No. 4,761,361 and U.S. Pat. No. 4,775,613.

It is may also be convenient to use silver half soaps. A preferred example of a silver half soap is an equimolar blend of silver carboxylate and carboxylic acid, which analyzes for about 14.5% by weight solids of silver in the blend and which is prepared by precipitation from an aqueous solution of the sodium salt of a commercial carboxylic acid.

Transparent sheet materials made on transparent film backing require a transparent coating. For this purpose a silver carboxylate full soap, containing not more than about 15% of free carboxylic acid and analyzing about 22% silver, can be used.

The methods used for making silver soap emulsions are well known in the art and are disclosed in *Research Disclosure*, April 1983, item 22812, *Research Disclosure*, October 1983, item 23419, and U.S. Pat. No. 3,985,565.

The silver halide and the non-photosensitive reducible silver source that form a starting point of development should be in catalytic proximity (i.e., reactive association). "Catalytic proximity" or "reactive association" means that they should be in the same layer, in adjacent layers, or in layers separated from each other by an intermediate layer having a thickness of less than 1 $\mu$m. It is preferred that the silver halide and the non-photosensitive reducible silver source be present in the same imaging layer.

The source of reducible silver is preferably present in an amount of about 5% by weight to about 70% by weight, and more preferably, about 10% to about 50% by weight, based on the total weight of the emulsion layers.

Reducing Agents

The reducing agent for the organic silver salt can be any material, preferably an organic material that can reduce silver ion to metallic silver. Conventional photographic developers such as methyl gallate, hydroquinone, substituted hydroquinones, hindered phenols, catechol, pyrogallol, ascorbic acid (and derivatives thereof), leuco dyes and other materials readily apparent to one skilled in the art can be used in this manner.

Hindered phenol reducing agents are preferred. These are compounds that contain only one hydroxy group on a given phenyl ring and have at least one additional substituent located ortho to the hydroxy group. Hindered phenol developers may contain more than one hydroxy group as long as each hydroxy group is located on different phenyl rings. Hindered phenol developers include, for example, binaphthols (that is dihydroxybinaphthyls), biphenols (that is dihydroxybiphenyls), bis(hydroxynaphthyl)methanes, bis (hydroxyphenyl)methanes, hindered phenols, and hindered naphthols each of which may be variously substituted.

Representative binaphthols include but are not limited to 1,1'-bi-2-naphthol, 1,1'-bi-4-methyl-2-naphthol and 6,6'-dibromo-bi-2-naphthol. For additional compounds see U.S. Pat. No. 5,262,295, incorporated herein by reference.

Representative biphenols include but are not limited to 2,2'-dihydroxy-3,3'-di-t-butyl-5,5-dimethylbiphenyl, 2,2'-dihydroxy-3,3',5,5'-tetra-t-butylbiphenyl, 2,2'-dihydroxy-3, 3'-di-t-butyl-5,5'-dichlorobiphenyl, 2-(2-hydroxy-3-t-butyl-5-methylphenyl)-4-methyl-6-n-hexylphenol, 4,4'-dihydroxy-3,3',5,5'-tetra-t-butyl-biphenyl and 4,4'-dihydroxy-3,3',5,5'-tetramethylbiphenyl. For additional compounds see U.S. Pat. No. 5,262,295.

Representative bis(hydroxynaphthyl)methanes include but are not limited to 4,4'-methylenebis(2-methyl-1-naphthol). For additional compounds see U.S. Pat. No. 5,262,295.

Representative bis(hydroxyphenyl)methanes include but are not limited to bis(2-hydroxy-3-t-butyl-5-methylphenyl) methane (CAO-5), 1,1-bis(2-hydroxy-3,5-dimethylphenyl)-

3,5,5-trimethylhexane (NONOX or PERMANAX WSO), 1,1-bis(3,5-di-t-butyl-4-hydroxyphenyl)methane, 2,2-bis(4-hydroxy-3-methylphenyl)propane, 4,4-ethylidene-bis(2-t-butyl-6-methylphenol) and 2,2-bis(3,5-dimethyl-4-hydroxyphenyl)propane. For additional compounds see U.S. Pat. No. 5,262,295.

Representative hindered phenols include but are not limited to 2,6-di-t-butylphenol, 2,6-di-t-butyl-4-methylphenol, 2,4-di-t-butylphenol, 2,6-dichlorophenol, 2,6-dimethylphenol and 2-t-butyl-6-methylphenol.

Representative hindered naphthols include but are not limited to 1-naphthol, 4-methyl-1-naphthol, 4-methoxy-1-naphthol, 4-chloro-1-naphthol and 2-methyl-1-naphthol. For additional compounds see U.S. Pat. No. 5,262,295.

More specific alternative reducing agents that have been disclosed in dry silver systems including amidoximes such as phenylamidoxime, 2-thienylamidoxime and p-phenoxyphenylamidoxime, azines (for example 4-hydroxy-3,5-dimethoxybenzaldehydrazine), a combination of aliphatic carboxylic acid aryl hydrazides and ascorbic acid, such as 2,2'-bis(hydroxymethyl)propionylbetaphenyl hydrazide in combination with ascorbic acid, a combination of polyhydroxybenzene and hydroxylamine, a reductone and/or a hydrazine [for example, a combination of hydroquinone and bis(ethoxyethyl)hydroxylamine], piperidinohexose reductone or formyl-4-methylphenylhydrazine, hydroxamic acids (such as phenylhydroxamic acid, p-hydroxyphenylhydroxamic acid, and o-alaninehydroxamic acid), a combination of azines and sulfonamidophenols (for example phenothiazine and 2,6-dichloro-4-benzenesulfonamidophenol), α-cyanophenylacetic acid derivatives (such as ethyl α-cyano-2-methylphenylacetate and ethyl α-cyanophenylacetate), bis-o-naphthols [such as 2,2'-dihydroxyl-1-binaphthyl, 6,6'-dibromo-2,2'-dihydroxy-1,1'-binaphthyl, and bis(2-hydroxy-1-naphthyl)methane], a combination of bis-o-naphthol and a 1,3-dihydroxybenzene derivative (for example 2,4-dihydroxybenzophenone or 2,4-dihydroxyacetophenone), 5-pyrazolones such as 3-methyl-1-phenyl-5-pyrazolone, reductones (such as dimethylamino-hexose reductone, anhydrodihydroaminohexose reductone and anhydrodihydro-piperidone-hexose reductone), sulfamidophenol reducing agents (such as 2,6-dichloro-4-benzenesulfonamidophenol, and p-benzenesulfonamidophenol), 2-phenylindane-1,3-dione and similar compounds, chromans (such as 2,2-dimethyl-7-t-butyl-6-hydroxychroman), 1,4-dihydropyridines (such as 2,6-dimethoxy-3,5-dicarbethoxy-1 4-dihydropyridine), bisphenols [such as bis(2-hydroxy-3-t-butyl-5-methylphenyl)methane, 2,2-bis(4-hydroxy-3-methylphenyl)propane, 4,4-ethylidene-bis(2-t-butyl-6-methylphenol) and 2,2-bis(3,5-dimethyl-4-hydroxyphenyl)propane], ascorbic acid derivatives (such as 1-ascorbylpalmitate, ascorbylstearate and unsaturated aldehydes and ketones), 3-pyrazolidones, and certain indane-1,3-diones.

Useful co-developer reducing agents can also be used as described for example in copending and commonly assigned U.S. Ser. No. 09/239,182 (filed Jan. 28, 1999 by Lynch and Skoog). These compounds are generally defined as having the following formula:

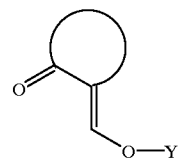

wherein Y is H, a metal (preferably, an alkali metal, and more preferably, sodium or potassium), or an alkyl group (preferably, an alkyl group having from 1 to 4 carbon atoms, and more preferably, a methyl or ethyl group), and the solid curved line represents the atoms and bonds necessary to complete a ring structure that may include heteroatoms (for example N, O, S). The ring structure can include one or more rings, including pendant and fused rings. In certain embodiments, the compounds include one main five- or six-membered ring, which may include heteroatoms within the ring, and optionally have at least one pendant or fused ring attached to this main ring.

The reducing agent (or mixture thereof) described herein is generally present as 1 to 10% (dry weight) of the imaging layer. In multilayer constructions, if the reducing agent is added to a layer other than an imaging layer, slightly higher proportions, of from about 2 to 15 weight % may be more desirable. Any co-developers may be present generally in an amount of from about 0.01% to about 1.5% (dry weight) of the imaging layer coating.

Other Addenda

The photothermographic elements of the invention can also contain other additives such as shelf-life stabilizers, toners, development accelerators, acutance dyes, post-processing stabilizers or stabilizer precursors, and other image-modifying agents as would be readily apparent to one skilled in the art.

The photothermographic elements of the present invention can be further protected against the production of fog and can be stabilized against loss of sensitivity during storage. While not necessary for the practice of the invention, it may be advantageous to add mercury (II) salts to the imaging layer(s) as an antifoggant. Preferred mercury (II) salts for this purpose are mercuric acetate and mercuric bromide.

Other suitable antifoggants and stabilizers, which can be used alone or in combination, include thiazolium salts as described in U.S. Pat. No. 2,131,038 and U.S. Pat. No. 2,694,716, azaindenes as described in U.S. Pat. No. 2,886,437, triazaindolizines as described in U.S. Pat. No. 2,444,605, mercury salts as described in U.S. Pat. No. 2,728,663, the urazoles described in U.S. Pat. No. 3,287,135, sulfocatechols as described in U.S. Pat. No. 3,235,652, the oximes described in GB 623,448, polyvalent metal salts as described in U.S. Pat. No. 2,839,405, thiuronium salts as described in U.S. Pat. No. 3,220,839, palladium, platinum and gold salts as described in U.S. Pat. Nos. 2,566,263 and 2,597,915, and 2-(tribromomethylsulfonyl)quinoline compounds as described in U.S. Pat. No. 5,460,938. Stabilizer precursor compounds capable of releasing stabilizers upon application of heat during development can also be used in combination with the stabilizers of this invention. Such precursor compounds are described in for example, U.S. Pat. Nos. 5,158,866, 5,175,081, 5,298,390 and 5,300,420.

In addition, certain substituted-sulfonyl derivatives of benzotriazoles (for example alkylsulfonylbenzotriazoles and arylsulfonylbenzotriazoles) have been found to be useful stabilizing compounds (such as for post-processing print stabilizing), as described in copending and commonly assigned U.S. Ser. No. 09/301,652 (filed Apr. 28, 1999 by Kong, Sakizadeh, LaBelle, Spahl and Skoug). These compounds have the general structure:

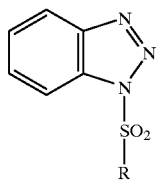

wherein R represents alkyl or alkenyl groups of up to 20 carbon atoms, aryl, alkaryl, aralkyl groups comprising up to 20 carbon atoms, aliphatic or aromatic heterocyclic ring groups containing up to 6 ring atoms or carbocyclic ring groups comprising up to 6 ring carbon atoms.

Furthermore, specific antifoggants/stabilizers have the general structure:

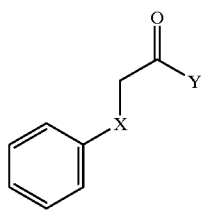

wherein X is —O— or —S—, and Y is —NH$_2$, —OH, or —O$^-$M$^+$ wherein M$^+$is a metal atom, can be included in the imaging layers of the elements. These compounds and their use are described in more detail in copending and commonly assigned U.S. Ser. No. 09/329,693 (filed Jun. 10, 1999 by Lynch, Skoug and Kong).

The use of "toners" or derivatives thereof that improve the image is highly desirable, but is not essential to the element. Preferably, if used, a toner can be present in an amount of about 0.01% by weight to about 10%, and more preferably about 0.1% by weight to about 10% by weight, based on the total dry weight of the layer in which it is included. Toners are usually incorporated in the photothermographic imaging layer. Toners are well known materials in the photothermographic art, as shown in U.S. Pat. Nos. 3,080,254, 3,847,612 and 4,123,282. Examples of toners include but are not limited to phthalimide and N-hydroxyphthalimide, cyclic imides (such as succinimide), pyrazoline-5-ones, quinazolinone, 1-phenylurazole, 3-phenyl-2-pyrazoline-5-one, and 2,4-thiazolidine-dione, naphthalimides (such as N-hydroxy-1,8-naphthalimide), cobalt complexes (such as cobaltic hexamine trifluoroacetate), mercaptans (such as 3-mercapto-1,2,4-triazole, 2,4-dimercaptopyrimidine, 3-mercapto-4,5-diphenyl-1,2,4-triazole and 2,5-dimercapto-1,3,4-thiadiazole), N-(aminomethyl)aryldicarboximides [such as (N,N-dimethylaminomethyl)phthalimide, and N-(dimethylaminomethyl)naphthalene-2,3-dicarboximide, a combination of blocked pyrazoles, isothiuronium derivatives, and certain photobleach agents [such as a combination of N,N'-hexamethylene-bis(1-carbamoyl-3,5-dimethylpyrazole), 1,8-(3,6-diazaoctane)bis(isothiuronium)-trifluoroacetate, and 2-(tribromomethylsulfonyl benzothiazole)], merocyanine dyes {such as 3-ethyl-5-[(3-ethyl-2-benzothiazolinylidene)-1-methyl-ethylidene]-2-thio-2,4-o-azolidinedione}, phthalazinone and phthalazinone derivatives, or metal salts or these derivatives [such as 4-(1-naphthyl)phthalazinone, 6-chlorophthalazinone, 5,7-dimethoxyphthalazinone, and 2,3-dihydro-1,4-phthalazinedione], a combination of phthalazine plus one or more phthalic acid derivatives (such as phthalic acid, 4-methylphthalic acid, 4-nitrophthalic acid, and tetrachlorophthalic anhydride), quinazolinediones, benzoxazine or naphthoxazine derivatives, rhodium complexes functioning not only as tone modifiers but also as sources of halide ion for silver halide formation in situ [such as ammonium hexachlororhodate (III), rhodium bromide, rhodium nitrate, and potassium hexachlororhodate (III)], inorganic peroxides and persulfates (such as ammonium peroxydisulfate and hydrogen peroxide), benzoxazine-2,4-diones (such as 1,3-benzoxazine-2,4-dione, 8-methyl-1,3-benzoxazine-2,4-dione and 6-nitro-1,3-benzoxazine-2,4-dione), pyrimidines and asym-triazines (such as 2,4-dihydroxypyrimidine, 2-hydroxy-4-aminopyrimidine and azauracil) and tetraazapentalene derivatives [such as 3,6-dimercapto-1,4-diphenyl-1H,4H-2,3a,5,6a-tetraazapentalene and 1,4-di-(o-chlorophenyl)-3,6-dimercapto-1H,4H-2,3a,5,6a-tetraazapentalene].

Binders

The photosensitive silver halide, the non-photosensitive reducible source of silver, the reducing agent system, and any other additives used in the present invention are generally added to at least one binder. The binder(s) that can be used in the present invention can be employed individually or in combination with one another. It is preferred that the binder be selected from hydrophobic polymeric materials, such as, for example, natural and synthetic resins that are sufficiently polar to hold the other ingredients in solution or suspension.

Examples of typical hydrophobic binders are polyvinyl acetals, polyvinyl chloride, polyvinyl acetate, cellulose acetate, polyolefins, polyesters, polystyrene, polyacrylonitrile, polycarbonates, methacrylate copolymers, maleic anhydride ester copolymers, butadiene-styrene copolymers and other materials readily apparent to one skilled in the art. Copolymers (including terpolymers) are also included in the definition of polymers. The polyvinyl acetals (such as polyvinyl butyral and polyvinyl formal) and vinyl copolymers (such as polyvinyl acetate and polyvinyl chloride) are particularly preferred.

Where the proportions and activities of the imaging layer require a particular developing time and temperature, the binder(s) should be able to withstand those conditions. Generally, it is preferred that the binder not decompose or lose its structural integrity at 120° C. for 60 seconds, and more preferred that it not decompose or lose its structural integrity at 177° C. for 60 seconds.

The polymer binder(s) is used in an amount sufficient to carry the components dispersed therein that is within the effective range of the action as the binder. The effective range can be appropriately determined by one skilled in the art. Preferably, a binder is used at a level of about 30% by weight to about 90% by weight, and more preferably at a level of about 45% by weight to about 85% by weight, based on the total dry weight of the layer in which they are included.

Photothermographic Formulations

The formulation for a photothermographic imaging layer can be prepared by dissolving and dispersing the binder, the photosensitive silver halide, the non-photosensitive reducible source of silver, the reducing agent for the non-photosensitive reducible silver source, and optional addenda in an inert organic solvent, such as toluene, 2-butanone or tetrahydrofuran.

Photothermographic elements can contain plasticizers and lubricants such as polyalcohols and diols of the type described in U.S. Pat. No. 2,960,404, fatty acids or esters such as those described in U.S. Pat. Nos. 2,588,765 and 3,121,060, and silicone resins such as those described in GB 955,061.

The elements can also contain matting agents such as starch, titanium dioxide, zinc oxide, silica, and polymeric beads including beads of the type described in U.S. Pat. Nos. 2,992, 101 and 2,701,245.

The photothermographic elements can include antistatic or conducting layers. Such layers may contain soluble salts (for example chlorides or nitrates), evaporated metal layers, or ionic polymers such as those described in U.S. Pat. Nos. 2,861,056 and 3,206,312, or insoluble inorganic salts such as those described in U.S. Pat. No. 428,451. Other antistatic agents are well known in the art.

The photothermographic elements may also contain electroconductive underlayers to reduce static electricity effects and improve transport through processing equipment. Such layers are described in U.S. Pat. No. 5,310,640.

The photothermographic elements can be constructed of one or more layers on a support. Single layer elements should contain the silver halide, the non-photosensitive reducible silver source material, the reducing agent for the non-photosensitive reducible silver source, the binder, as well as optional materials such as toners, acutance dyes, coating aids and other adjuvants.

Two-layer constructions (having two distinct layers on the support) preferably contain silver halide and non-photosensitive reducible silver source in one emulsion layer (usually the layer adjacent to the support) and the reducing agent system and other ingredients in the second layer or distributed between both layers. If desired, the developer and co-developer may be in separate layers. Two layer constructions comprising a single imaging layer coating containing all the ingredients and a protective topcoat are also envisioned.

Photothermographic formulations described can be coated by various coating procedures including wire wound rod coating, dip coating, air knife coating, curtain coating, slide coating or extrusion coating using hoppers of the type described in U.S. Pat. No. 2,681,294. It is preferred that two or more layers (such as the "first" and "second" layers described above) can be coated simultaneously by the procedures described in U.S. Pat. Nos. 2,761,791, 4,001,024 (Dittman et al), 4,569,863 (Keopke et al), 5,340,613, 5,733, 608 (Kessel et al), 5,849,363 (Yapel et al), 5,843,530 (Jerry et al), 5,861,195 (Bhave et al) and GB 837,095. A typical coating gap for the emulsion layer can be from about 10 to about 750 μm, and the layer can be dried in forced air at a temperature of from about 20° C. to about 150° C. It is preferred that the thickness of the layer be selected to provide maximum image densities greater than about 0.2, and more preferably, from about 0.5 to about 5.0, as measured by a MacBeth Color Densitometer Model TD 504.

When the layers are coated simultaneously using various coating techniques, it is preferred that the "carrier" layer formulation comprise a single phase mixture of the two or more polymers described above.

Preferably, two or more layers are applied to a film support using slide coating. The first layer can be coated on top of the second layer while the second layer is still wet. It is also preferred that the first and second fluids used to coat these layers be the same organic solvents (or organic solvent mixtures), or essentially the same solvents. If there is any water in the solvent mixtures, it comprises less than 50% of the total solvent volume.

In preferred embodiments of the coating method, the wet coating thickness of the adhesion-promoting layer ("second" or "fourth" layer) is generally less than 50 μm, and preferably from about 0.1 to about 20 μm.

While the first and second layers can be coated on one side of the film support, the method can also include forming on the opposing side of said polymeric support, C) a fourth layer out of a fourth fluid predominantly comprising a fourth organic solvent, the fourth layer containing no silver, and D) a third layer comprising at least one polymer out of a third fluid predominantly comprising a third organic solvent, the fourth layer comprising two or more polymers that form a single phase mixture, the two or more polymers in the fourth layer including a third polymer serving to promote adhesion between the polymeric support and the fourth layer, and a fourth polymer that is compatible with or of the same class as the film-forming polymer in the third layer.

In such embodiments, the first layer can be a photothermographic imaging layer, and the third layer can be an antihalation layer, an antistatic layer, or a layer containing a matting agent (such as silica).

Moreover, the first and second layers of such elements can comprise a polyvinyl acetal or a polyester resin, and the third and fourth layer can independently comprise a polyester resin or a cellulosic polymer.

In another embodiment of this invention, the polymer-containing layer is an "antihalation layer" comprising one or more compounds (for example, antihalation dyes) that provide antihalation characteristics. Such acutance dyes and antihalation dyes may also be incorporated into an antihalation layer according to known techniques. It is preferred that the photothermographic elements of this invention contain an antihalation coating on the support opposite to the side on which the imaging layer and topcoat layers are coated. Antihalation and acutance dyes useful in the present invention are described in U.S. Pat. Nos. 5,135,842, 5,266, 452 5,314,795 and 5,380,635.

While the imaging elements of the present can be imaged in any suitable manner consistent with the type of material using any suitable imaging source (typically some type of radiation or electronic signal), the following discussion will be directed to the preferred photothermographic elements.

For such elements, development conditions will vary, depending on the construction used, but will typically involve heating the imagewise exposed element at a suitably elevated temperature. Thus, the latent image can be developed by heating the exposed element at a moderately elevated temperature of, for example, from about 80 to about 250° C. (preferably from about 100 to about 200° C.) for a sufficient period of time, generally from about 1 to about 120 seconds. Heating can be accomplished using any suitable heating means such as a hot plate, a steam iron, a hot roller or a heating bath.

In some methods, the development is carried out in two steps. Thermal development takes place at a higher temperature for a shorter time (for example at about 150° C. for up to 10 seconds), followed by thermal diffusion at a lower temperature (for example at about 80° C.) in the presence of a transfer solvent. The second heating step prevents further development and allows the dyes that are already formed to diffuse out of a photosensitive imaging layer into a receptor layer.

Materials and Methods for Examples

A photothermographic emulsion coating formulation was prepared using a silver salt homogenate prepared as described in Col. 25 of U.S. Pat. No. 5,434,043 (noted above), incorporated herein by reference. This formulation was then prepared as described in Cols. 19–24 of U.S. Pat. No. 5,541,054 (Miller et al), also incorporated herein by reference.

A topcoat formulation was prepared for application over the photothermographic emulsion formulation with the following components:

| | |
|---|---|
| 2-Butanone (methyl ethyl ketone, MEK) | 86.1 weight % |
| Vinyl sulfone | 0.35 weight % |
| Benzotriazole | 0.27 weight % |
| Silica | 0.21 weight % |
| Acryloid A-21 polymer (Rohm & Haas) | 0.47 weight % |
| Cellulose acetate butyrate polymer (CAB 171-15S, Eastman Chemical Co.) | 12.25 weight % |
| Antihalation dye* | 0.21 weight % |
| Ethyl-2-cyano-3-oxobutanoate | 0.23 weight % |

*This compound is 1,3-bis[2,3-dihydro-2,2-bis[[(1-oxohexyl)oxy]methyl]-1H-perimidin-6-yl]-2,4-dihydroxy-, bis (inner salt).

An antihalation layer formulation was similarly prepared using the following components:

| | |
|---|---|
| 2-Butanone (methyl ethyl ketone, MEK) | 88.7 weight % |
| PE2200 polyester (Bostik Inc.) | 0.1602 weight % |
| Cellulose acetate butyrate (CAB 381-20 Eastman Chemical Company) | 11.5 weight % |
| Silica | 0.1498 weight % |
| Antihalation dye* (same as above) | 0.07 weight % |
| 4-Methylphthalic acid | 0.202 weight % |
| Antistatic agent** | 1.221 weight % |

**This compound is $C_8F_{17}SO_3^-H_3N^+(CH_2CH_2O)_{12}CH_2CH_2^+NH_3SO_3^-C_8F_{17}$.

The various formulations were coated on blue-tinted poly(ethylene terephthalate) film base (178 µm, PET) using conventional coating techniques and a laboratory-size coating machine (similar to a conventional full size machine).

"BL16", "BN'18", "LL4150" and "BS18" represent various poly(vinyl butyral) products available from Wacker Chemical Company.

A "cross-hatch" adhesion test was performed according to ASTM D3359-92A in which a coated film was cut with a razor blade in a cross-hatched pattern, a piece of commercially available 3M #610 tape was placed on the pattern and then quickly lifted off. The amount of coating left on the film is the measure of adhesion and was rated on a scale of 0 (worst, more than 65% coating removed) to 5 (best, no coating removed).

"Edge delamination" is also a measure of adhesion. In this evaluation, a coated film is slit using a conventional slitting knife, and a microscope is used to measure the length (mm) of coated film that has been lifted off the film by the slitting action. Generally, the acceptable edge delamination is less than 0.10 mm.

"Starry night" is a defect indicative of a lack of density in an imagewise exposed (for example, 815 nm laser) and heat-processed photothermographic film element. The defect is evaluated at 50× magnification and given a rating of 1 (severe) to 10 (no defect). The acceptable defect evaluation is "7" which is considered "visual comparison standard".

"Haze" is measured by conventional methods using a commercially available Gardner Hazemeter. The lower the amount of haze, the better.

Adhesion-promoting polymers useful in the present invention were identified as follows. First of all, polymers (adhesion-promoting or "first" polymers) that adhere to a polyester film support, for example PET, were identified by coating a solution (10 weight %) of the polymer in MEK onto bare polyester film, dried and tested for adhesion as described in ASTM D3359-92a. Secondly, a solution of the tested polymer was blended in a solution of a film-forming polymer to be used in the layer to be adhered to the film support in a suitable solvent for both polymers. The ratio of the two polymers in the resulting solution and the coating weights of each were adjusted so that when a coating was dried, the polymer blend would adhere to the polyester film support. This second adhesion evaluation ranged from "0" (less than 35% adhering to the support) to "5" (perfect adhesion).

After suitable adhesion-promoting polymers were selected, the % solids of the polymer blend was adjusted to obtain the desired rheology for coating.

Representative polymers blends that were given an evaluation of "5" for adhesion were:

1) At 10% solids, from 20 to 90 weight % PE5833B polyester resin (Bostik Inc.) with from 80 to 10 weight % of BN18 poly(vinyl butyral). The film-forming layer was a photothermographic imaging layer as described above.

2) At 6% solids, from 20 to 90 weight % PE2700-LMW polyester resins (Bostik Inc.) with from 80 to 10 weight % of cellulose acetate butyrate (CAB 381-20). The film-forming layer was an antihalation layer as described above.

These polymer blends are merely representative of what can be used in the present invention, and other polymer blends could be readily determined by a skilled artisan using routine experimentation and the teaching presented herein.

Comparative Example 1

In these experiments various amounts of PE 2200 polyester resin were added to the photothermographic emulsion formulation in an attempt to improve adhesion of that formulation to the polyester film support. The photothermographic emulsion layer was then overcoated with the topcoat formulation. Thus, no separate adhesion-promoting layer (or "carrier" layer) was used. The following TABLE I shows the results from this experiment.

TABLE I

| Experiment | Weight % PE2200 in Imaging Layer** | Haze* | Cross-Hatch Adhesion | Starry Night* |
|---|---|---|---|---|
| 01 | 0 | 23.6% | 0 | 7 |
| 05 | 1 | 24.4% | 1 | 7 |
| 07 | 3 | 26.2% | 2 | 6 |
| 10 | 5 | 30.0% | 2 | 4 |

*Average of three tests.
**Weight % of poly(vinyl butyral).

As one can see from these data in TABLE I, the incorporation of increasing amounts of PE2200 polyester resin into the photothermographic emulsion layer increased the starry night effect and haze. While the use of 1% PE2200 polyester resin provided acceptable starry night effect, the edge delamination was found to be 0.2 mm which is highly unacceptable. Comparative Example 2

In this set of experiments, PE2200 polyester resin was coated out of MEK (38% solids) as a "carrier" layer underneath the photothermographic emulsion layer, followed by the topcoat. All of the experiments showed that the use of PE2200 polyester resin as an adhesion-promoting layer at a variety of thickness' provided improved cross-hatch adhesion (2–3 ratings) but delamination was very poor (0.2–0.7 mm). The photothermographic imaging layer did not adhere well to the layer below even though the lower layer adhered well to the polyester film support.

Comparative Example 3

In this set of experiments, a polyvinyl butyral (Type BS18) was coated (3% solids) out of MEK as a carrier layer underneath the photothermographic imaging layer. Poor adhesion (0 rating in cross-hatch test) of the adhesion-promotion layer to the film support was observed.

Comparative Example 4

In another set of experiments, the photothermographic imaging layer formulation was diluted prior to coating (from 37% to 15% solids) to form a carrier layer containing PE2200 polyester resin (similar to Comparative Example 1). The photothermographic formulation also included poly(vinyl butyral) (BL16) as the binder material for the emulsion. TABLE II below shows the results obtained. The addition of PE2200 polyester resin to the imaging layer increased the level of starry night effect as the PE2200 polyester resin coverage was increased. It is believed that this effect is caused by the formation of "gels" from the polyester resin. Adhesion was not affected in any way in these experiments.

TABLE II

| Experiment | PE2200/BL16 Weight Ratio | Carrier Dry Thickness (μm) | Starry Night | Cross-Hatch Adhesion* | Edge Delamination* (mm) |
|---|---|---|---|---|---|
| 1 | 0.54/99.46 | 2.1 | 10 | 2 | 0.2 |
| 2 | 0.54/99.46 | 1.53 | 10 | 2.7 | 0.2 |
| 3 | 1/99 | 2.1 | 9 | 3 | 0.2 |
| 4 | 1/99 | 1.53 | 9 | 3 | 0.2 |
| 5 | 3/97 | 2.1 | 4 | 3 | 0.2 |
| 6 | 3/97 | 1.53 | 4 | 3 | 0.2 |
| 7 | 5/95 | 2.1 | 1 | 1.7 | 0.2 |
| 8 | 5/95 | 1.53 | 1 | 1.3 | 0.2 |

*Average of three samples.

Comparative Example 5

MEK was coated as a carrier layer underneath the photothermographic imaging layer. The problem observed in this experiment was what is known as the "strike through" problem that is described in U.S. Pat. No. 5,861,195 (Bhave et al). There was no improvement in adhesion properties.

EXAMPLE 1

In a preferred set of experiments of the present invention, we prepared a photothermographic element having a poly(ethylene terephthalate) film support that had slide coated thereon:

An adhesion-promoting layer (coated as a carrier layer) comprising a heterogeneous mixture of PE2200 polyester resin and BL16 poly(vinyl butyral) at various weight ratios and coating thickness was coated (10% solids) out of MEK.

A photothermographic imaging layer using the formulation described above.

A topcoat as described above.

TABLE III below shows the adhesion and other performance results of the various experiments.

TABLE III

| Experiment | PE2200/BL16 Ratio | Carrier Dry Thickness (μm) | Haze | Cross-Hatch Adhesion** | Edge Delamination** (mm) |
|---|---|---|---|---|---|
| Control 1 | * | 2.1 | 21.2 | 2 | 0.2–0.3 |
| Control 2 | * | 0.51 | 22 | 2 | 0.3 |
| Invention 1 | 10/90 | 0.34 | 22.6 | 2 | 0.05–0.1 |
| Invention 2 | 10/90 | 0.14 | 23.0 | 2.7 | 0–0.05 |
| Invention 3 | 12/88 | 0.16 | 22.8 | 3 | 0.05–0.1 |
| Invention 4 | 12/88 | 0.34 | 23 | 2.3 | 0–0.05 |
| Invention 5 | 14/86 | 0.16 | 23/4 | 3.3 | 0–0.05 |
| Invention 6 | 14/86 | 0.74 | 22.4 | 3 | 0–0.05 |

*Carrier layer was diluted photothermographic emulsion formulation (15% solids) containing 0.54/99.46 weight ratio of PE2200 to BL16.
**Average of three samples.

The data in TABLE III show that adhesion was improved without any increase in haze by using an adhesion-promoting layer according to the present invention. The Control elements exhibited severe edge delamination. All of the experiments exhibited a starry night evaluation of at least 8.

EXAMPLE 2

The experiments of Example 1 were repeated on a production coating machine and the coated elements were slit using production slitting or chopping operations. However, small amounts of high molecular weight polyester resin were allowed to settle out of the adhesion-promoting layer formulation before coating thereby providing a single phase mixture of polymers for coating.

The slit elements were evaluated for edge delamination. The results are presented in TABLE IV below. It is apparent that the elements of the present invention exhibited excellent adhesion properties in the various layers compared to the Control elements.

TABLE IV

| Observation | Control 1* | Control 2* | Invention** | Invention** |
|---|---|---|---|---|
| Slit edge delamination (mm) | 0.2 | 0.25 | 0.05 | 0.05 |
| Chopped edge delamination (mm) | 0.15 | 0.3 | 0.05 | 0.05 |
| Cross-Hatch Adhesion | 1 | 1 | 2 | 2 |

*Carrier layer was diluted photothermographic emulsion formulation as described in Example 1.
**Replicates of Element used in Invention 3 experiment of Example 1.

EXAMPLE 3

This example demonstrates the use of the preferred adhesion-promoting as a carrier layer underneath a photothermographic imaging layer. The adhesion-promoting layers comprised single phase mixtures of a polyester resin (PE5833 available from Bostik) and poly(vinyl butyral) (BN18) at various weight ratios and coating thickness'. The photothermographic imaging layer was formulated as described above without the addition of PE2200 polyester resin. The results of various evaluations are provided in TABLE V below, demonstrating improved cross-hatch adhesion as well as an improved resistance to delamination.

TABLE V

| Experiment | PE5833/BN18 Ratio | Dry Carrier Thickness μm | Cross-Hatch Adhesion* | Delamination** (mm) |
|---|---|---|---|---|
| 1 | 10:90 | 0.79 | 4 | 0.04–0.06 |
| 2 | 30:70 | 0.79 | 5 | 0.04–0.06 |
| 3 | 30:70 | 0.33 | 5 | 0.04–0.06 |
| 4 | 20:80 | 1.58 | 5 | 0.04–0.06 |

*Average of three samples.

EXAMPLE 4

This example demonstrates the use of an adhesion-promoting layer underneath a non-imaging layer, in this case an antihalation layer. A poly(ethylene terephthalate) film support was coated as described in TABLE VI below with the antihalation layer formulation described above. The adhesion-promoting layers comprised a single phase mixture of polymers in all cases.

TABLE VI

| Experiment | PE2200/CAB381-20 Ratio | Dry Carrier Thickness (μm) | Cross-Hatch Adhesion* |
|---|---|---|---|
| Control | None | not applicable | 0.3 |
| 1 | 15:85 | 0.3 | 2 |
| 2 | 20:80 | 0.15 | 2 |

*Average of 3 samples.

EXAMPLE 5

This example demonstrates the use of a preferred adhesion-promoting layer as a carried layer underneath another non-imaging layer, that is an antistatic (matte-containing) layer typically provided on the backside of a photothermographic element of this invention. A poly(ethylene terephthalate) film support was coated with the following formulations using the various polymers ratios described in TABLE VII below to provide single phase polymer mixtures. The results are also shown in TABLE VII.

The adhesion-promoting layer formulation contained the following:

| | |
|---|---|
| 2-Butanone (methyl ethyl ketone, MEK) | 95 weight % |
| PE2700-LMW polyester resin (Bostik Inc.) and cellulose acetate butyrate (CAB 381-20) | 4.53 weight % (total for both polymers) |
| Antihalation dye* (as defined above) | 0.47 weight % |

An antihalation layer formulation was similarly prepared using the following components:

| | |
|---|---|
| 2-Butanone (methyl ethyl ketone, MEK) | 85.68 weight % |
| Cellulose acetate butyrate (CAB 381-20) | 12.8 weight % |
| Silica (Syloid 74X6000) | 0.17 weight % |
| Antistatic agent** (as described above) | 1.35 weight % |

TABLE VII

| Experiment | PE2700-LMW/CAB381-20 Ratio | Dry Carrier Thickness (μm) | Cross-Hatch Adhesion* |
|---|---|---|---|
| Control | None | not applicable | 1 |
| 1 | 20:80 | 0.55 | 4 |
| 2 | 40:60 | 0.44 | 5 |

*Average of 3 samples.

The data in TABLE VII indicate that the articles of the present invention having an adhesion-promoting layer underneath an antistatic layer provided improved adhesion to the film support compared to the Control article containing no adhesion-promoting layer.

EXAMPLE 6

Photothermographic elements of this invention were prepared as described in Example 3 above except that the adhesion-promoting layers were formulated using various mixtures of polymers. Some of the polymer mixtures were single phase (homogeneous) while others were multi-phase (heterogeneous). The polymer mixtures used and the various weight ratios are shown in TABLE VIII below.

TABLE VII

| FIRST POLYMER(S) | SECOND POLYMER* | RATIO OF 1$^{ST}$ POLYMER(S) TO 2$^{ND}$ POLYMER | HOMOGENEOUS MIXTURE? (YES/NO) |
|---|---|---|---|
| PE2200 polyester resin | BL-16 | 3:97 to 14:86 | No |
| Pentalyn H (rosin ester by Hercules) | BM18 | 70:30 to 30:70 | Yes |
| Pentalyn H | BL-16 | 70:30 to 10:90 | Yes |
| PE2200 polyester resin | BM-18 | 70:30 to 30:70 | No |
| PE5833 polyester resin | BN-18 | 10:00 to 90:10 | Yes |
| PE5833 polyester resin | BS-18 | 10:90 | Yes |
| PE2700LMW polyester resin | BL-16 | 4:96 to 7:93 | No |
| PE2700LMW and PE3200B polyesters resins | BN-18 | 3.99:0.01:96 to 9:1:90 | Yes |
| PE2700LMW polyester resin | BN-18 | 4:96 | No |
| PE5833 polyester resin | BL-16 | 10:90 to 90:10 | Yes |
| PE3200B polyester resin | BL-16 | 4:96 to 10:90 | Yes |
| PE3550B polyester resin | BL-16 | 4:96 to 10:90 | Yes |
| PE3550B polyester resin | LL4150 | 4:96 | No |
| PE5833 polyester resin | LL4150 | 4:96 | Yes |
| PE2700B polyester resin | BL-16 | 4:96 to 10:90 | No |

TABLE VII-continued

| FIRST POLYMER(S) | SECOND POLYMER* | RATIO OF 1ST POLYMER(S) TO 2ND POLYMER | HOMOGENEOUS MIXTURE? (YES/NO) |
|---|---|---|---|
| PE3200B polyester resin | LL4150 | 4:96 | No |
| Poly(vinylacetate) from Wacker Chemical | BL-16 | 70:30 to 90:10 | Yes |

*All of these polymer were poly(vinyl butyral)s.

All of the polymer mixtures shown in TABLE VIII improved cross hatch adhesion and improved resistance to delamination in the elements of this invention.

EXAMPLE 7

Articles of this invention were prepared as described in Example 5 above except that the adhesion-promoting layers were formulated using various mixtures of polymers. All of the polymer mixtures were single phase (homogeneous). The polymer mixtures used and the various weight ratios are shown in TABLE IX below.

TABLE IX

| FIRST POLYMER | SECOND POLYMER* | RATIO OF 1ST POLYMER TO 2ND POLYMER | HOMOGENEOUS MIXTURE? |
|---|---|---|---|
| PE2200 polyester resin | CAB-381-20 | 5:95 to 15:85 | Yes |
| PE2700LMW polyester resin | CAB-381-20 | 20:80 to 40:60 | Yes |
| PE5833 polyester resin | CAB-381-20 | 10:90 | Yes |
| PE2700B polyester resin | CAB-381-20 | 10:90 | Yes |
| PE3200B polyester resin | CAB-381-20 | 10:90 | Yes |
| PE3550B polyester resin | CAB-381-20 | 10:90 | Yes |
| PE2200 polyester resin | CAB-500-5 | 5:95 to 20:80 | Yes |

*All of these polymers were cellulose acetate butyrates.

All of the polymer mixtures shown in TABLE IX improved cross hatch adhesion and resistance to delamination.

The invention has been described in detail with particular reference to preferred embodiments thereof, but it will be understood that variations and modifications can be effected within the spirit and scope of the invention.

We claim:

1. An article comprising a polymeric support and having disposed thereon:
    a) a first layer comprising at least one film-forming polymer, and
    b) a second layer interposed between and adhering said first layer and said polymeric support and containing no silver,
    said second layer being coated out of a predominantly organic solvent medium, and comprising a mixture of two or more polymers that include a first polymer serving to promote adhesion of said second layer to said polymeric support, and a second polymer forming a single phase mixture with said first polymer,
    wherein said film-forming polymer in said first layer and said second polymer in said second layer are the same or different polyvinyl acetal resins.

2. The article of claim 1 wherein said polymeric support is an uncoated and untreated polyester support.

3. The article of claim 1 wherein said first layer is an antihalation layer, an antistatic layer, or a layer containing a matting agent.

4. The article of claim 1 wherein said first layer is a photothermographic imaging layer.

5. The article of claim 1 wherein both said film-forming polymer in said first layer and second polymer in said second layer is the same polyvinyl acetal.

6. The article of claim 1 wherein said second layer has a dry thickness of up to 20 μm.

7. The article of claim 6 wherein said second layer has a dry thickness of from about 0.05 to about 5 μm.

8. The article of claim 1 wherein said first polymer in said second layer is a polyvinyl acetal resin, a polyester resin, a cellulosic polymer, or a vinyl polymer.

9. The article of claim 1 wherein said second layer comprises a single phase mixture of a polyvinyl acetal resin and a polyester resin.

10. The article of claim 1 wherein the weight ratio of said first polymer to said second polymer in said second layer is from about 2:98 to about 95:5.

11. The article of claim 1 wherein said first layer comprises at least 1 weight percent (based on dry weight) of said film-forming polymer.

12. The article of claim 1 wherein said second layer comprises an antihalation dye.

13. An article comprising a polymeric support and having disposed on one side of said polymeric support:
    a) a first layer comprising at least one film-forming polymer, and
    b) a second layer interposed between and adhering said first layer and said polymeric support and containing no silver,
    said second layer being coated out of a predominantly organic solvent medium, and comprising two or more polymers that form a single phase mixture, said two or more polymers including a first polymer serving to promote adhesion of said second layer to said polymeric support, and a second polymer,
    wherein said film-forming polymer in said first layer and said second polymer in said second layer are the same or different polyvinyl acetal resins, cellulosic polymers, or maleic anhydride-ester copolymers, and disposed on the opposing side of said polymeric support:
  a) a third layer comprising at least one film-forming polymer, and
  b) a fourth layer interposed between and adhering said third layer and said polymeric support and containing no silver,
said fourth layer being coated out of a predominantly organic solvent medium, and comprising two or more polymers that form a single phase mixture, said two or more polymers in said fourth layer including a third polymer serving to promote adhesion of said fourth layer to said polymeric support, and a fourth polymer,
wherein said film-forming polymer in said third layer and said fourth polymer in said fourth layer are the same or different polyvinyl acetal resins, cellulosic polymers, or maleic anhydride-ester copolymers.

14. The article of claim 13 wherein said film-forming polymer in said first layer and said second polymer in said second layer are the same or different polyvinyl acetal resins or cellulosic polymers, and said film-forming polymer in said third layer and said fourth polymer in said fourth layer are the same or different polyvinyl acetal resins or cellulosic polymers.

15. The article of claim 13 wherein said first layer is a silver-containing imaging layer.

16. The article of claim 15 wherein said first layer is a photothermographic imaging layer.

17. The article of claim 13 wherein said third layer is an antihalation layer, an antistatic layer, or a layer containing a matting agent.

18. The article of claim 13 wherein said second and fourth layers are directly disposed on said polymeric support.

19. A photothermographic element comprising a polymeric support and having a photothermographic imaging layer containing a silver halide, a silver salt of a fatty acid, a silver reducing agent, and at least one film-forming polymer disposed on one side of said polymeric support, and optionally having a non-imaging layer containing at least one film-forming polymer on the opposite side of said polymeric support, and
  having interposed between and adhering said polymeric support and either said photothermographic imaging layer or said non-imaging layer, a non-imaging adhesion-promoting layer coated out of a predominantly organic solvent medium, said non-imaging adhesion-promoting layer comprising a mixture of two or more polymers that include a first polymer serving to promote adhesion of said non-imaging adhesion-promoting layer to said polymeric support, and a second polymer that forms a single phase mixture with said first polymer,
  wherein said film-forming polymer of said photothermographic imaging layer and second polymer in said non-imaging adhesion-promoting layer are the same or different polyvinyl acetal resins, cellulosic polymers, vinyl polymers, methacrylate polymers, or maleic anhydride-ester copolymers.

20. The photothermographic element of claim 19 wherein said non-imaging adhesion-promoting layer has a dry thickness of less than 20 μm.

21. The photothermographic element of claim 20 wherein said non-imaging adhesion-promoting layer has a dry thickness of from about 0.05 to about 5 μm.

22. The photothermographic element of claim 19 wherein said non-imaging layer is an antihalation layer, an antistatic layer, or a layer containing a matting agent.

23. The photothermographic element of claim 19 wherein both said photothermographic imaging layer and said non-imaging adhesion-promoting layer include a single phase mixture of polyvinyl acetal or a polyester resin.

24. A photothermographic element comprising a polyester film support and having on one side thereof, a photothermographic imaging layer comprising a silver halide, a silver salt of a fatty acid, a silver reducing agent, and at least one binder polymer that is a polyvinyl acetal, and
  interposed between and adhering said polyester film support to said photothermographic emulsion layer, a non-imaging adhesion-promoting layer that is coated out of a predominantly organic solvent medium, said non-imaging adhesion-promoting layer comprising a single phase mixture of a polyvinyl acetal and a polyester resin,
  said element further comprising on the opposite side of said polyester film support, an antistatic layer comprising an antistatic agent, a matting agent and a cellulosic polymer binder, and
  interposed between and adhering said polyester film support to said antistatic layer, a non-imaging antihalation dye-containing adhesion-promoting layer that is coated out of a predominantly organic solvent medium, said non-imaging antihalation dye-containing adhesion-promoting layer comprising a single phase mixture of a cellulosic polymer and a polyester resin.

25. A method of promoting adhesion of a first layer to a polymeric support comprising:
  A) forming on a polymeric support, a second layer out of a second fluid predominantly comprising a second organic solvent, said second layer containing no silver, and
  B) simultaneously or subsequently, forming a first layer containing at least one film-forming polymer out of a first fluid predominantly comprising a first organic solvent on said second layer,
  said second layer comprising a mixture of two or more polymers that include a first polymer serving to promote adhesion of said second layer to said polymeric support, and a second polymer that forms a single phase mixture with said first polymer,
  wherein said film-forming polymer of said first layer and said second polymer in said second layer are the same or different polyvinyl acetal resins.

26. A method of reducing delamination in a multilayer article during slitting, cutting or chopping said multilayer article comprising:
  A) applying to a polymeric support, second layer out of a second fluid predominantly comprising a second organic solvent, said second layer containing no silver, and
  B) simultaneously or subsequently, applying a first layer containing at least one film-forming polymer that is coated out of a first fluid predominantly comprising a first organic solvent,
  said second layer comprising a mixture of two or more polymers that include a first polymer serving to promote adhesion between said polymeric support and said second layer, and a second polymer that forms a single phase mixture with said first polymer,
  wherein said film-forming polymer of said first layer and said second polymer in said second layer are the same or different polyvinyl acetal resins.

27. The method of claim 26 wherein said first and second layers are applied to said polymeric support simultaneously.

28. The method of claim 27 wherein said first layer is an antihalation layer, an antistatic layer, or a layer containing a matting agent.

29. The method of claim 27 wherein said first layer is a photothermographic imaging layer.

30. A method of preparing an article comprising:

A) forming on a polymeric support, a second layer out of a second fluid predominantly comprising a second organic solvent, said second layer containing no silver, and B) forming on said second layer, a first layer containing at least one film-forming polymer out of a first fluid predominantly comprising a first organic solvent, said second layer comprising a mixture of two or more polymers that include a first polymer serving to promote adhesion between said polymeric support and said second layer, and a second polymer that forms a single phase mixture with said first polymer, wherein said film-forming polymer of said first layer and said second polymer in said second layer are the same or different polyvinyl acetal resins.

31. The method of claim 30 wherein said first and second layers are formed simultaneously by multilayer coating or said first layer is coated on said second layer while said second layer is still wet with said second fluid.

32. The method of claim 31 wherein said first and second layers are formed using slide coating.

33. The method of claim 30 wherein said first layer is coated on top of said second layer while said second layer is still wet with said second fluid.

34. The method of claim 30 wherein said first and second organic solvents are the same.

35. The method of claim 30 wherein the wet coating thickness of said second layer is less than 50 μm.

36. The method of claim 35 wherein the wet coating thickness of said second layer is from about 0.1 to about 20 μm.

37. The method of claim 30 further comprising forming on the opposing side of said polymeric support, C) a fourth layer out of a fourth fluid predominantly comprising a fourth organic solvent, said fourth layer containing no silver, and D) a third layer comprising at least one film-forming polymer out of a third fluid predominantly comprising a third organic solvent, said fourth layer comprising a mixture of two or more polymers that include a third polymer serving to promote adhesion between said polymeric support and said fourth layer, and a fourth polymer that forms a single phase mixture with said third polymer, wherein said film-forming polymer in said third layer and said fourth polymer in said fourth layer are the same or different polyvinyl acetal resins or cellulosic polymers.

38. The method of claim 37 wherein said first layer is a photothermographic imaging layer, and said third layer is an antihalation layer, an antistatic layer, or a layer containing a matting agent.

39. The method of claim 37 wherein said second layer comprises a single phase mixture of a polyvinyl acetal and a polyester resin, and said fourth layer comprises independently a single phase mixture of a polyester resin and a cellulosic polymer.

40. The photothermographic material of claim 19 wherein said first polymer in said non-imaging adhesion-promoting layer is a polyvinyl acetal resin, a polyester resin, a cellulosic polymer, or a vinyl polymer.

41. The photothermographic material of claim 19 wherein the weight ratio of said first polymer to said second polymer in said non-imaging adhesion-promoting layer is from about 2:98 to about 95:5.

42. The article of claim 1 wherein the dry thickness of said second layer is from 0.05 to 1 μm.

43. The photothermographic material of claim 19 wherein the dry thickness of said non-imaging adhesion-promoting layer is from 0.05 to 1 μm.

44. A photothermographic element comprising an untreated and uncoated polymeric support and having a photothermographic imaging layer containing a silver halide, a silver salt of a fatty acid, a silver reducing agent, and at least one film-forming polymer disposed on one side of said polymeric support, and optionally having a non-imaging layer containing at least one film-forming polymer on the opposite side of said polymeric support, and having interposed between and directly adhering said polymeric support to either said photothermographic imaging layer or said non-imaging layer, a non-imaging adhesion-promoting layer coated out of a predominantly organic solvent medium, said non-imaging adhesion-promoting layer comprising a mixture of two or more polymers that include a first polymer serving to promote adhesion of said non-imaging adhesion-promoting layer directly to said polymeric support, and a second polymer that forms a single phase mixture with said first polymer, wherein said film-forming polymer of said photothermographic imaging layer and said second polymer in said non-imaging adhesion-promoting layer are the same or different polyvinyl acetal resins, cellulosic polymers, vinyl polymers, methacrylate polymers, or maleic anhydride-ester copolymers.

* * * * *

UNITED STATES PATENT AND TRADEMARK OFFICE
CERTIFICATE OF CORRECTION

PATENT NO. : 6,355,405 B1 Page 1 of 1
DATED : March 12, 2002
INVENTOR(S) : Thomas J. Ludemann, Gary E. LaBelle, Thomas C. Geisler, Jerry L. Warren, Anne E. Crump and Aparna C. Bhave It is certified that error appears in the above-identified patent and that said Letters Patent is hereby corrected as shown below:

Title page,
After Item [22], insert:
-- Related U.S. Application Data,
[60] Provisional Application Serial No. 60/121,794, filed 26 February 1999. --

Column 1,
Line 3, insert -- CROSS REFERENCE TO RELATED APPLICATION
Reference is made to and priority claimed from U.S. Provisional Application Serial No. 60/121,794, filed 26 February 1999, entitled A MULTI-LAYER ARTICLE WITH IMPROVED ADHESION AND METHOD OF MAKING --

Signed and Sealed this

Third Day of September, 2002

*Attest:*

*Attesting Officer*

JAMES E. ROGAN
*Director of the United States Patent and Trademark Office*